(12) United States Patent
Wells (10) Patent No.: US 8,498,752 B2
(45) Date of Patent: Jul. 30, 2013

(54) DECOUPLING CONTROLLER FOR POWER SYSTEMS

(75) Inventor: Charles H. Wells, Emerald Hills, CA (US)

(73) Assignee: OSIsoft, LLC, San Leandro, CA (US)

( * ) Notice: Subject to any disclaimer, the term of this patent is extended or adjusted under 35 U.S.C. 154(b) by 98 days.

(21) Appl. No.: 13/200,901

(22) Filed: Oct. 4, 2011

(65) Prior Publication Data

US 2012/0083935 A1 Apr. 5, 2012

Related U.S. Application Data

(60) Provisional application No. 61/389,281, filed on Oct. 4, 2010.

(51) Int. Cl.
*G05D 17/00* (2006.01)

(52) U.S. Cl.
USPC ............................ 700/292; 700/295; 700/297

(58) Field of Classification Search
USPC .................................. 700/30, 295, 292, 297
See application file for complete search history.

(56) References Cited

U.S. PATENT DOCUMENTS

| | | | |
|---|---|---|---|
| 6,185,468 B1 | 2/2001 | Wells | |
| 7,116,010 B2 | 10/2006 | Lasseter et al. | |
| 7,474,016 B2 | 1/2009 | Wang et al. | |
| 7,531,915 B2 | 5/2009 | Wang et al. | |
| 7,877,169 B2* | 1/2011 | Slota et al. | 700/286 |
| 7,983,799 B2 | 7/2011 | Bose et al. | |
| 2007/0129110 A1* | 6/2007 | Lasseter et al. | 455/557 |
| 2008/0215187 A1* | 9/2008 | Lasseter et al. | 700/282 |
| 2008/0278000 A1* | 11/2008 | Capp et al. | 307/21 |
| 2010/0032964 A1* | 2/2010 | Hoffmann et al. | 290/40 B |
| 2010/0038907 A1* | 2/2010 | Hunt et al. | 290/7 |
| 2010/0274407 A1 | 10/2010 | Creed | |
| 2011/0118885 A1* | 5/2011 | Oi et al. | 700/293 |
| 2011/0216562 A1* | 9/2011 | Gengenbach | 363/71 |

OTHER PUBLICATIONS

A method for decoupling multi-input multi-ouput two-dimensional systems by Atsushi Kawakami, date Jul. 1998.*
Microgrids black start and islanded operation by J.A. Pecas Lopes, date Aug. 2005.*
The Microgrid concept prepared by EPRI prepared for Transmission Reliability Program US Department of Energy and prepared by Robert Lasseter, Abbas Akhil, Chris Marnay, John Stephens, Jeff Dagle, Ross Guttromson, A . Sakis Meliopoulous, Robert Yinger and Joe Eto, Date Dec. 2001.*

* cited by examiner

*Primary Examiner* — Mohammad Ali
*Assistant Examiner* — Ziaul Karim
(74) *Attorney, Agent, or Firm* — Lumen Patent Firm (57) ABSTRACT

A power system controller using a 2×2 decoupling controller, a model reference, and feedback with delay. Embodiments provide control of microgrid frequency F and voltage V. In addition, this technique can also be used to control the real and reactive power delivered from the microgrid to the connected macrogrid. The control engineering approach is the same in both cases, but the roles of the four variables involved are reversed.

13 Claims, 3 Drawing Sheets

Fig. 3 though frequency and voltage (F,V) [sic]

DECOUPLING CONTROLLER FOR POWER SYSTEMS

CROSS-REFERENCE TO RELATED APPLICATIONS

This application claims priority from U.S. Provisional Patent Application 61/389,281 filed Oct. 4, 2010, which is incorporated herein by reference.

FIELD OF THE INVENTION

The present invention relates generally to electrical power system controllers. More specifically, it relates to improved microgrid power system controllers, and to improved wind farm and solar farm voltage and frequency controllers.

BACKGROUND OF THE INVENTION

Electricity is traditionally generated by large centralized power plants and transmitted long distances by power distribution systems. To reduce the need for long-distance power generation and dependence upon a few large centralized power plants, electricity is being generated more and more by smaller power generation facilities distributed throughout the macrogrid. Numerous private or municipal entities, for example, are operating modest size photovoltaic and wind power facilities. Such facilities, or a localized grouping of such facilities, are often referred to as microgrids. Although normally connected to the macrogrid, a microgrid can also function autonomously. When operating independent of the macrogrid, the microgrid must control its own frequency and voltage that supply the loads inside the microgrid. Additionally, when the microgrid reconnects to the macrogrid, it must meet certain standards for reconnection. In the USA, these standards are the IEEE 1547.

The Consortium for Electric Reliability Technology Solutions (CERTS) has proposed a microgrid concept in which the microgrid is able to automatically isolate itself in the event of a macrogrid power disturbance or failure without disrupting the power supply to loads within the microgrid. Similarly, the microgrid can automatically reconnects to the macrogrid when it returns to normal. The CERTS microgrid concept thus requires a relatively sophisticated and reliable power system controller. There is thus a need to provide improved and reliable microgrid power system controllers.

SUMMARY OF THE INVENTION

The present inventor has recognized that state-of-the art CERTS microgrid power system controllers are designed based on the assumption that the real and reactive power components (i.e., P and Q) within the microgrid at each point of local energy source connection to the microgrid main power bus are always independent, i.e., the current power system controller designs neglect the coupling between real and reactive power components. Consequently, when the two control loops are treated as independent, then a change in one will affect the other. For example, if a load enters the microgrid it will require more power to be delivered to the microgrid bus, thus the generators on the bus will have to accelerate to meet the new requirement for real power. However, increasing the real power delivery will also increase the reactive power delivered. This change in reactive power will cause the voltage to change. Then the voltage controller will have to make a change to its controller to maintain voltage. Thus, the two controllers fight against each other, causing the voltage and frequency on the microgrid bus to oscillate. If this is not damped out, then the oscillations can increase in size until a relay trip point is reached which will then disconnect the source from the microgrid bus. This is then likely to trip the other sources in the microgrid and the entire system will fail.

The industry has treated P and Q systems as independent because of lack of awareness of multivariable controllers. Additionally, the oscillations have been misunderstood as being caused by load changes rather than being induced by the fighting controllers. The power industry in general has not focused on power quality issues but rather on just having power available. But in today's world, the loads are sensitive to frequency and voltage variations and many power purchasers are now beginning to state maximum deviations in frequency and voltage.

Embodiments of the present invention are based on the insight that P and Q are coupled and provide a method to decouple the variables using feedback controllers. A novelty of this is the recognition that real and reactive power are coupled so that when the RMS voltage measurement or the voltage angle between the generation source and the microgrid bus (measured using PMUs that have accurate GPS based clocks) are changed (due to changes in loads and changes in the power outputs from Solar panels in the microgrid, or due to disturbances caused by electric vehicle charging systems inside the microgrid) both real and reactive power change. Frequency and voltage are made independent by using a 2×2 decoupled controller to change P and Q simultaneously. P and Q define the relationship between voltage and current at the generation source, and frequency and voltage at the microgrid bus depend on the total P and Q injected into the bus by all generation sources on the bus. This is the power injected by any source into the microgrid bus. This innovation is designed for use with any AC electric power source. It will be most useful in next-generation inverters for use in batteries, solar panels, fuel cells, microturbines, wind farms and other energy sources.

In one aspect, the present invention provides a power system controller including a 2×2 decoupling controller, a reference model, and a feedback circuit. The 2×2 decoupling controller has a real power error value input and separate reactive power error value input, a frequency delta value output and separate voltage delta value output, and a processor for computing the frequency delta value from both the real power error value and the reactive power error value, and for computing the voltage delta value from both the real power error value and the reactive power error value. The reference model has a processor for computing from the frequency delta value and the voltage delta value a predicted real power value and a predicted reactive power value. The feedback circuit combines outputs of the reference model with measured real and reactive power values from a generator, and feeds back the combined signal to the 2×2 decoupling controller, introducing a time delay (e.g., 100 ms or less) of the predicted real power value and the predicted reactive power value.

The combined signal fed back by the feedback circuit preferably includes (P,Q) setpoint values, and is fed back to the real power error value input and the separate reactive power error value input. The reference model may compute the predicted real power value and the predicted reactive power value using a 2×2 matrix whose elements are functions of measured values of a source voltage V, a bus voltage E, an impedance X, and a relative angle between the source and the bus $\delta$. The 2×2 decoupling controller may be implemented using four PID controllers.

In alternate embodiments, the roles of real and reactive power (P,Q) are exchanged with frequency and voltage (F,V)

in the above. For example, the setpoints are (F,V) values, the 2×2 decoupling controller computes (P,Q) delta values from (F,V) error values, and the reference model computes predicted values for (F,V) from the (P,Q) delta values.

In yet another aspect, the present invention provides a method for bumpless and balanceless power transfer switching between a microgrid and a macrogrid when disconnecting or connecting to the macrogrid. The method includes switching a 2×2 decoupled controller to manual mode, adjusting (i.e., accelerating or decelerating) a speed of a generator of the microgrid so that its output absolute voltage angle matches the absolute voltage angle of the macrogrid. When the difference is zero, the switching is made. Similarly, before the 2×2 controller is turned on, the angle difference between the microgrid and the macrogrid is driven to zero by adjusting (i.e., accelerating or decelerating) the generator. When the angle difference is zero, the 2×2 decoupled control is turned to automatic mode. This method naturally results in a voltage phase angle difference of zero, at which point the power between the macrogrid and microgrid may be switched. This method exceeds all of the IEEE 1547 standards for switching distributed generation sources into or out of the macrogrid.

DETAILED DESCRIPTION

The principles of the present invention may be appreciated by first considering the behavior of the CERTS microgrid controller.

Figure 2:
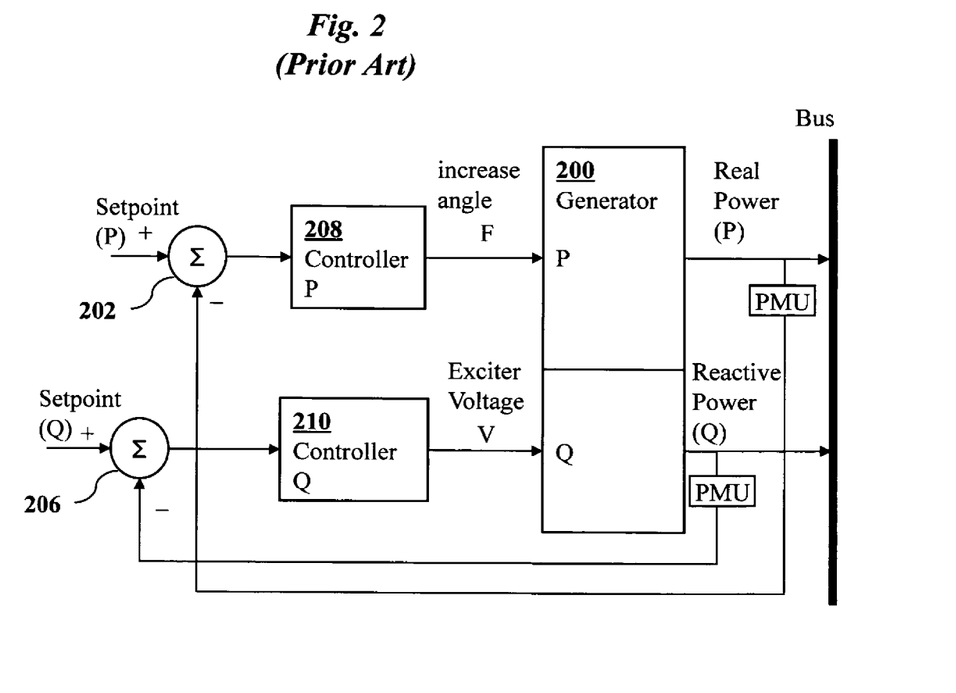
FIG. 2 is a block diagram of a conventional CERTS microgrid power system controller.

FIG. 2, for example, shows a prior art controller system for generator 200 with separate P and Q feedbacks to independent summation elements 202 and 206 and simple proportional-integral-derivative (PID) controllers 208 and 210. The derivative term is rarely, however, used since the oscillation between P and Q would be amplified by a derivative term in the standard controllers. Thus, the controllers are in effect PI controllers. The P and Q set points entering from the left of the figure are selected by the grid dispatcher to request specific amounts of real power P and reactive power Q (e.g., 100 MW real power and 10 MVAR reactive power). The dispatcher will request different set points depending on how the grid is responding to loads that cause distortions in voltage and frequency (e.g., if the grid frequency is low, the dispatcher requests a higher P value; if the grid voltage is low, the dispatcher will request a higher Q value). The dispatcher, however, is not normally aware of coupling between P and Q, nor are they trained to look for it.

The P setpoint is issued by the grid operator for either increasing or decreasing the real power setpoint. The Q setpoint is independently set by the grid operator to improve voltage support. These two processes, however, are coupled in the generator, so that increasing real power will affect both the frequency and the voltage. Similarly, increasing the reactive power will cause both frequency and voltage to change. This causes the P and Q control loops to "fight" each other. One approach to compensate for this behavior is to design a droop control scheme. This approach, however, is an artificial method of trying to cope with the fact that the process is inherently closely coupled.

The generator 200 can be either conventional with inputs controls for speed and output voltage, or inverters from a wind farm or solar panel or a battery. The inverter controls are electronic rather than mechanical. For example, the frequency from the inverter can be increased simply by adjusting an input setting to the inverter control system. This normally would come from the grid. This is called grid commutation. The voltage output of the inverter is adjusted electronically.

The grid operator observes the F and V measured at the bus and the makes the request to change the setpoints of P and Q to hold F and V constant. A phasor measurement unit (PMU) may be used to measure F, V, P, Q values.

Controllers 208 and 210 are standard proportional and integral controllers, in some cases only proportional controllers. They add a "droop correction" to compensate for the fact the system is actually coupled. Controller 208 calculates an F value from a P value, while controller 210 independently calculates a V value from a Q value. These calculations are independent in the sense that the calculation of V from Q does not depend on the value of P or F, and the calculation of F from P does not depend on the value of V or Q.

The F and V values represent the frequency and voltage that is desired to be produced by the generator 200. The frequency is directly proportional to the speed of the generator shaft (in case of inverter, it is the commanded frequency, normally commutated from the grid line frequency). So as the system produces more from the generator, one will speed up the shaft of the generator, which in turn increases the angle. This causes more power to flow from the generator.

To increase the V from the generator, the voltage on the exciter coils for the generator is increased. This increases the generator voltage which in turn increases the Q (reactive power from the generator).

The Q is controlled via voltage regulation of the generator, normally the stator voltage.

The CERTS controllers are specifically designed to control microgrid frequency F and voltage V with two separate independent control loops. The first loop includes controller 208 and summation element 202, while the second loop includes controller 210 and summation element 206.

The basic CERTS controller assumes that the real component of the power from any source injected into the microgrid bus is a function only of angle, and that the reactive component of the power from the source injecting power into the microgrid bus is only a function of voltage. This assumption, however, is not valid. It holds only when there is constant current injection into the load, which is a reasonable approximation when the loads are light and at low voltage. In practice, however, this is not always the case: Most microgrids will operate at higher voltages (12 kV or higher) and will have large current loads. For example a typical microgrid may supply 1 to 5 Mw of power to the microgrid bus. This would include many loads of 500 Hp or more to drive water chillers, compressors, pumps, and large air handlers. In such situations, an accurate and reliable controller needs to base the controller design on physical equations describing power flow that take into consideration the coupling of the variables. The implementation, however, requires that the variables be computationally decoupled. Accordingly, the present inventor has developed a technique for computationally decoupling the variables while taking into account their physical coupling.

In contrast with the CERTS controller design, embodiments of the present invention provide control of microgrid frequency F and voltage V using a 2×2 decoupling controller. In addition, this technique can also be used to control the real and reactive power delivered from a microgrid to the connected macrogrid. The control engineering approach is the same in both cases, but the roles of the four variables involved are reversed.

According to the principles of the present invention, the basic physical equations for control are transformed into a form that allows P and Q to be decoupled. Once the basic power flow equations are formulated in such a manner, a decoupling controller (e.g., as described in U.S. Pat. No. 6,185,468 to Wells, which is incorporated herein by reference) can be used to solve this important problem in power control systems. U.S. Pat. No. 6,185,468 to Wells includes both the decoupling control and model reference controllers which make the system very robust when there are changes in model parameters. This controller is also called a model reference controller. A key innovation at the basis of the present invention is the recognition by the inventor that power systems are inherently 2×2 coupled system and that they can be effectively controlled with real time feedback measurements, as will now be described in detail.

In a decoupling controller for distributed energy resources (DERs) on common bus, the real power (P) and reactive power (Q) are given by $$P = \frac{3VE\sin\delta}{2X} \quad \text{(eq. 1)}$$

$$Q = \frac{3V}{2X}(V - E\cos\delta) \quad \text{(eq. 2)}$$

where
V is the machine output voltage,
E is the bus voltage.

$\delta = \delta_V - \delta_E$, $\delta_V$ is the absolute positive sequence voltage angle at the generation source,
$\delta_E$ is the absolute positive sequence voltage angle at the bus, and
X is the impedance between the source and the bus.

In these equations, P and Q are shown as the dependent variables. That is, if one changes V or $\delta$, then both P and Q will change. The V and $\delta$ variables are on the right hand side of the equations. These represent power flowing into a bus. On the other hand, assume that P and Q can be changed independently, as in a generator connected to a bus. The equations can be rewritten with V and $\delta$ on the left hand side of the equations. Then, by increasing P, both the frequency F (i.e., the first time derivative of the angle $\delta$), and the voltage will change. This clearly shows that the power flow equations for the system are coupled and should not be in general be treated as two independent processes.

Taking the total derivatives of eq. 1 and of eq. 2 above, we obtain, respectively, $$\Delta P = \frac{3E\sin\delta}{2X}\Delta V + \frac{3VE\cos\delta}{2X}\Delta\delta \quad \text{(eq. 3)}$$

$$\Delta Q = \frac{3(2V - E\cos\delta)}{2X}\Delta V + \frac{3VE\sin\delta}{2X}\Delta\delta \quad \text{(eq. 4)}$$

We are now going to define the problem of controlling the amount of real power P and reactive power Q delivered to a macrogrid from a microgrid controller by simultaneously adjusting the voltage and angle of the generations systems on the connecting bus to the macrogrid. To increase the angle one must increase the speed of the machine (rpm), this causes the angle to increase. Once the desired angle is achieved, the machine is decelerated back to nominal frequency (60 Hz in USA). This is the angle between the voltage waveform at the generator (V) and the voltage waveform at the bus (E). Since we have PMUs that measure angle, we can control the angle between the generator and bus to obtain any desire value by increasing or decreasing the speed of generator. In the case of an inverter, the speed is electronically controlled by setting control parameters in the inverter electronics.

Now we define the following vector to represent the independent control variables:

$$u = \begin{bmatrix} \Delta V \\ \Delta \delta \end{bmatrix}$$

Figure 1:
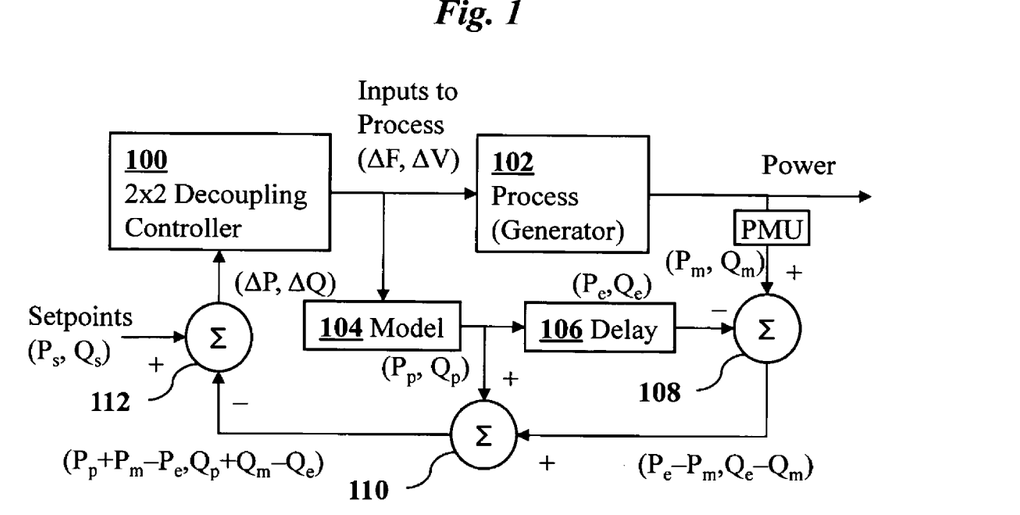
FIG. 1 is a block diagram of a microgrid power system controller according to an embodiment of the invention.

The decoupling controller 100 can change these variables independently and simultaneously to keep the P and Q values equal to their set point values.

These set points are determined by the grid operator when the microgrid is connected to the grid. He does this to maintain frequency and voltage on the high side of the microgrid connection. However, if the microgrid is operating disconnected from the grid, then the formulation of the control problem is different and an alternate form of the equations is used to maintain the microgrid bus at a constant frequency (60 Hz) and constant voltage (typically 12 kV).

We define the following vector to represent the dependent variables (also called state variables, or output variables) controlled using the decoupled controllers:

$$x = \begin{bmatrix} \Delta P \\ \Delta Q \end{bmatrix}.$$

The task is to control the state variables to specified setpoints. The controller 100 makes simultaneous adjustments to $\Delta P$ and $\Delta Q$ to hold $\Delta \delta$ and $\Delta V$ to zero.

Using eq. 3 and 4, the input and output variables are then related according to $$x = Gu \quad \text{(eq. 5)}$$

where $$G = \begin{bmatrix} G_{11} & G_{12} \\ G_{21} & G_{22} \end{bmatrix} = \begin{bmatrix} \frac{3E\sin\delta}{2X} & \frac{3VE\cos\delta}{2X} \\ \frac{3(2V - E\cos\delta)}{2X} & \frac{3VE\sin\delta}{2X} \end{bmatrix}$$

The four gain components of the 2×2 matrix G are functions of measured values of the source voltage V, the bus voltage E, the impedance X, and the relative angle between the source and the bus $\delta$. These four gain components are time-varying gains in the model. That is, they depend on values of the parameters X and E as well as the independent variables. Consequently, the controller should be adaptive or be of the robust controller design that is less sensitive to model changes. In a robust controller, one assumes these values are constant, the robust controller handles the variations. This approach is also known as model reference control or model predictive control.

A reader who is experienced in power flow problems will understand the relationship between the relative angle between the voltage angle at the generation source and the voltage angle at the receiving bus. The angle is the fundamental driving force for real power flow in AC systems. But the angle cannot be controlled directly. It is controlled by increasing or decreasing the speed of the generator rotor or by settings on the inverter (commutator). So, to increase the angle, the generator shaft has to be accelerated. And similarly, to decrease the angle the rotor has to be decelerated. If the system is in control, the angle is constant. If the system is not in control, the angle will rotate counter clockwise with excess power to the bus and will rotated clockwise if there is insufficient power to the bus to meet the loads.

This relationship can now be used to develop a decoupled power controller. For example, consider a battery or solar panel or generator inverter as the control device between the bus and the energy source. The frequency and the voltage can be controlled to change the real and reactive power delivered.

A schematic block diagram implementing this technique is shown in FIG. 1. The 2×2 decoupling controller 100 may be implemented as four PID controllers. These may be implemented in accordance with the teachings of the present invention and those of the above cited Wells patent using standard controllers and can be tuned using traditional "bump" tests or can be tuned using standard PID tuning rules. The four PID controllers can be also represented as a 2×2 matrix of controllers. There are two inputs to the controllers: real power error and reactive power error ($\Delta P$ and $\Delta Q$ from the set points P and Q). Each error signal is sent to two controllers: $\Delta P$ goes to two PID controllers that compute $\Delta F$ and $\Delta V$. Similarly, $\Delta Q$ goes to two PID controllers that also compute $\Delta F$ and $\Delta V$. These two sets of $\Delta F$ and $\Delta V$ values then are provided to model 104 and to the generator 102. This is the model 104 derived in Eq. 5. The stock and steam (mu1, mu2) variables in the Wells patent correspond to the (F, V) variables in this description, and the basis weight and moisture (x1, x2) variables correspond to the (P, Q) variables herein. Note that the model includes parameters such as E and X. This is why the controller is called model reference control. The delta values $\Delta P$ and $\Delta Q$ are computed in the model are added to the current values of P and Q that were used to compute the deltas. This is the linearization point. So the model computes the changes which are then added back into the original linearization point to yield a modeled value of P and Q. These are sometimes called the full position of the model outputs ($P_p, Q_p$).

The time delay block 106 an important element that most engineers neglect to include. The delay prevents the system from ringing and being hard to tune. In a system for P and Q the time delay is short, e.g., less than 1 s, preferably less than 100 ms. In some processes this time delay can be very long, on the order of several minutes. So the output from block 104 is delayed to provide values ($P_e, Q_e$) which represent the best estimate of the values of P and Q. If the model is a good representation of the actual measured process values ($P_m, Q_m$) then the summing junction 108 will yield zero. In other words, if the model has good estimates and a good value for the time delay, the model output will equal the measured values. In this case these is no actual measured value feedback to summing junction 110. Only the model predicted value ($P_p, Q_p$) would then be fed back to summation junction 112. This is the real secret to why the controller is so good. It eliminates the time delay, which normally causes control loops to oscillate and when this happens, the operators turn them off. Again this is the reason the controller is called model reference. Some in the industry also call it robust control and others call it model predictive control.

The set points P, Q come from the grid operator, when in grid-connected mode. The ($P_m, Q_m$) measurements from the process 102 are measurements made using a PMU at the delivery bus.

Each of the control blocks in FIG. 1 may be implemented in a digital computer that is programmed in any language. A typically example is an SEL 3354 computer programmed in the C language. The implementation can also be done in any PLC or programmable relay. SEL makes a complete line of programmable relays that could implement this control. The process block 102 can be either the generator or the inverter (connected to a DC source such a wind turbine or solar panels or battery).

Based on the equations above, the decoupling controller 100 computes four control transfer functions for four PID controllers. A PID controller is industry standard proportional, integral, derivative controller. The transfer functions are normally standard PID controllers and the decoupling matrices. A detailed description of how to compute these transfer functions is outlined in the Wells patent cited above, and the equations identified in the Wells patent are used in the model 104. In accordance with the teachings of the present invention, the eq. 5 model replaces the model used in the Wells patent. The Wells patent specifically refers to a model of a paper machine, which is replaced herein with the model of the generator. P, Q variables herein are analogs of basis weight and moisture, and F and V variables herein are analogs of stock and steam. The outputs from the controller are normally the change in the input variable to the process, so normally the changes are added to the current values. These are the inputs to the actual model 104. This is the set of equations derived above showing the relationship between the (F, V) as inputs to the generator and the (P, Q) which are the outputs. The variable F is the frequency (we are using $\Delta F$ to denote difference in frequency from 60 Hz). This is essentially the linearization process. So when we take the total derivatives in Eq. 3 and 4, this is the linearization process. Note that outputs from the model are the predicted value of the output from the generator 102.

Note that if the model plus delay precisely represents the process, the summing junction 108, will result in zero measurement feedback. All the feedback from summing junction 110 in that case will be from the predicted values from model 104. This type of controller is thus called a model predictive controller. It is very stable and can be used in systems with very long delay times. This type of controller is used extensively in paper machine control systems. The present inventor, however, has recognized that the basic power flow equations can be structured in such a way that they become available in a form that can be used in such a 2×2 decoupled controller. This approach could also be used with other decoupling controller techniques, such as when the controller is not controlling P and Q, but is controlling frequency and voltage. This is an important case when the microgrid is selling ancillary services to the macrogrid. In this case P and Q are independent, and F and V are the dependent variables. If one increased P to the macrogrid, the F will increase, similarly if one increases Q, the voltage will increase. This is shown in equations 1 and 2.

The fundamental power flow equations can be solved in two ways: one where the independent variables are P and Q and the other way where the independent variables are F and V.

The frequency F is the first time derivative of the angle. So to control F, the angle is adjusted. Increasing angle will cause the frequency to increase and likewise decreasing the angle will lower the frequency. But normally one will increase the frequency (rpm) of the generator which will increase the angle. Thus, to increase the angle, the generator speed must be increased.

Now we provide details how to formulate the control problem so that frequency and voltage can be controlled using P and Q. This is the problem one would solve if applying this for control of the bus inside the microgrid or if controlling voltage and frequency on the high side of the transformer connecting the microgrid to the macrogrid.

Left-multiplying both sides of Eq. 5 by the inverse of G we obtain $$G^{-1}x = G^{-1}Gu$$

or $$G^{-1}x = u$$

which can be written as $$u = HX$$

where we define $$H = G^{-1} \quad \text{(eq. 6)}$$

Notice that eq. 6 has the same general form as eq. 5. The similarity is even more evident if we define $$u = x'$$

and $$x = u'$$

so that eq. 6 becomes $$x' = Hu' \quad \text{(eq. 7)}$$

So this teaches how to use the decoupled controller for controlling frequency and voltage u=x' as the dependent variables.

Those skilled in the art will recognize that the change in angle Δδ is directly related to frequency F since frequency is defined as the time rate of change of angle, i.e., $$F = \frac{d}{dt}\delta$$

Another implementation of the technology is for the control of frequency and voltage inside a microgrid. In this case, the real and reactive power are used to control the frequency and voltage. The same equations for power flow apply, but in this case the independent variables become power (P) and reactive power Q. The dependent variables are voltage and frequency.

Consider a microgrid with multiple sources of generation in the grid. For example, wind, solar, turbines, internal combustion engines, and batteries. These sources are connected to a common bus that distributes power to the loads. Each power connection to the microgrid is typically through an inverter that supports control of the amount of real and reactive power delivered to the grid. For each source of power on the microgrid, we apply the PQ controller based on measured frequency and voltage on the mail microgrid bus. This is similar to the CERTS controller for microgrids; however, that controller has two independent controllers one for frequency (controlled by real power injection) and the other is voltage which is controlled by reactive power injects.

Figure 3:
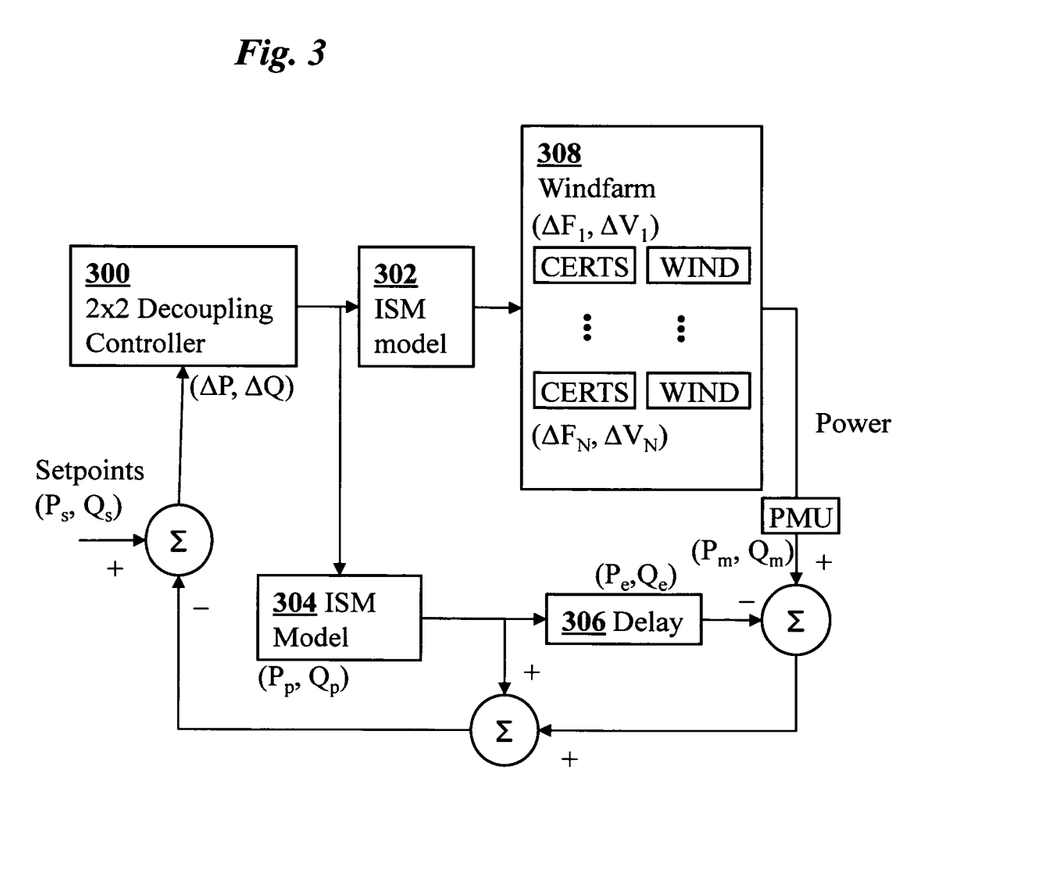
FIG. 3 is a block diagram illustrating an embodiment of the invention as applied to a wind farm microgrid.

FIG. 3 shows how one controller can output to a set of N wind turbines, where N may be 100 or more. This embodiment is useful for controlling wind farms and large solar farms. For a wind farm, each turbine would get a change in frequency and a change in voltage. This will cause the wind farm to respond to the request for more real or reactive power.

Elements 300, 302, 304, 306 in FIG. 3 are analogous to corresponding elements 100, 102, 104, 106 in FIG. 1. However, FIG. 3 differs in that it shows how the outputs from the controller 300 can be used for more than one generator. Specifically, the outputs are provided to ISM model 302 which generates a set of N values (F, V) provided to wind farm 308. Each (F, V) value is used by a CERT controller in wind farm 308 to control a particular wind generator. This application of the invention is useful in wind farms initially for voltage and frequency control (CERTS controllers). In addition, however, one 2×2 controller may also be used to control multiple turbines or solar inverters. This invention also is important in solar farms with many "strings", each inverter would receive signals to increase/decrease frequency and voltage.

The preferred implementation of this system for microgrids measures the frequency and voltage on the bus with a time synchronized measurement device such as a PMU and sends these signals to each of the controllable power generation sources on the microgrid. Each PQ controller uses these measurements to regulate their individual P and Q output to regulation voltage and frequency using the decoupled controller.

The execution rate of the PQ controllers would be at the same rate that data is supplied by the PMU, in most cases in the US this would be at 30 or 60 Hz and in countries using 50 Hz at the baseline frequency, the controllers would be executed at 50 Hz or 100 Hz. This a reliable high speed connection between the measurement device and the controllers will be required. This is often via Ethernet lines, either copper or fiber.

This invention is directly applicable to wind farm control of P and Q at the point of common connection. This approach is similar to that outlined in the first part of this description. In this case, the frequency and voltage are used to control the P and Q at the point of common connection (PCC). Frequency is adjusted by the individual turbine inverters to change the positive sequence phase angle relationship between the wind turbines and the point of common connection. Often the inverters are commutated to the macrogrid frequency which may not be at nominal frequency. So we suggest the frequency set point comes directly from the 2×2 controller. This can also be controlled by accelerating or decelerating the turbine speed (older type one and two turbine controllers). Acceleration of the turbine will cause the local frequency to increase thus increasing the power flow to the PCC. This is often known as a velocity controller since the frequency is the first derivative of phase angle and hence the rate of change of phase angle. There is a recent Federal Energy Regulatory Commission (FERC) order (661a) that states that the power factor (i.e., ratio of reactive power to real power) must be maintained at leading or lagging 0.95 reactive at the point of common connection. This would normally be done by very expensive static VAR compensation devices. Using the PQ technology disclosed herein, this can be done with the PQ controller.

In FIG. 3 there is a simulation of the entire wind farm network including the currently collectors and any other voltage control devices in the wind farm network. The ISM is a reference to a three phase non-linear network model of power networks. It was developed using EPRI funding and is available for commercial use from a company called Electrical Distribution Design.

A typical application of the controller is to control frequency and voltage of the connected grid by adjusting the real and reactive power flowing between the grid and the microgrid. Before the controller is turned on, it is important that the positive sequence voltage phase angle difference between the grid and the microgrid be close to zero. The technique of the present invention will automatically drive the inside voltage phase angle difference to zero so the controller can be turned either to automatic control or to manual control without causing a disturbance either inside the microgrid or to the grid itself. This is often called bumpless and balanceless transfer in other industries. This is unique in the power field and has not been considered standard practice by power system engineers. The IEEE 1547 standard discusses the maximum allowed angle before switching. Using the techniques of the present invention, that angle will be kept exactly equal to zero, so the switching can occur anytime without a bump.

This concept is very important in microgrid systems, since they are expected to be able to reconnect and disconnect from the grid without any "flicker" of the lights inside the microgrid. This can be accomplished only by using expensive fast switches with zero crossing switching. However, with the present invention the switching can occur with out expensive switches or breakers by simply maintaining the positive sequence voltage angle difference across the connection point at zero. In this case there is no power flowing cross the switch event though it is closed. Thus there is no arc when the switch is opened.

The invention claimed is:

1. A power system controller comprising: a 2×2 decoupling controller having a real power error value input and separate reactive power error value input, a frequency delta value output and separate voltage delta value output, and a processor configured to the frequency delta value by independently and simultaneously changing values corresponding to both the real power error value and the reactive power error value using a matrix of four controllers, and configured to compute the voltage delta value by independently and simultaneously changing values corresponding to both the real power error value and the reactive power error value using the matrix of four controllers;
   a reference model having a processor configured to compute from the frequency delta value and the voltage delta value a predicted real power value and a predicted reactive power value using a 2×2 matrix whose elements are functions of measured values;
   a feedback circuit combining outputs of the reference model with real-time measured real and reactive power values from a generator to form a combined signal, and feeding back the combined signal to the 2×2 decoupling controller, wherein the feeding back includes introducing a time delay of the predicted real power value and the predicted reactive power value;
   wherein the real power error value input and the reactive power error value inputs are based on the combined signal and the time delay;
   wherein the 2×2 decoupling controller is further configured to computationally decouple values of real power and reactive power in order to compute the frequency delta and the voltage delta.

2. The power system controller of claim 1 wherein the reference model computes the predicted real power value and the predicted reactive power value using a 2×2 matrix whose elements are functions of measured values of a source voltage V, a bus voltage E, an impedance X, and a relative angle between the source and the bus $\delta$.

3. The power system controller of claim 1 wherein the 2×2 decoupling controller is implemented using four PID controllers.

4. The power system controller of claim 1 wherein the time delay is less than 100 ms.

5. The power system controller of claim 1 wherein the combined signal fed back by the feedback circuit includes (P,Q) setpoint values.

6. The power system controller of claim 1 wherein the feeding back of the combined signal to the 2×2 decoupling controller comprises feeding back the combined signal to the real power error value input and the separate reactive power error value input.

7. A power system controller comprising: a 2×2 decoupling controller having a frequency error value input and separate voltage error value input, a real power delta value output and reactive power delta value output, and a processor configured to compute the real power value by independently and simultaneously changing values corresponding to both the frequency error value and the voltage error value using a matrix of four controllers, and configured to compute the reactive power delta value by independently and simultaneously changing values corresponding to both the frequency error value and the voltage error value using a matrix of four controllers;
   a reference model having a processor configured to compute from the real power delta value and the reactive power delta value a predicted frequency value and a predicted voltage value using a 2×2 matrix whose elements are functions of measured values;
   a feedback circuit combining outputs of the reference model with real-time measured frequency and voltage values from a generator to form a combined signal, and feeding back the combined signal to the 2×2 decoupling controller, wherein the feeding back includes introducing a time delay of the predicted frequency value and the predicted voltage value;
   wherein the real power error value input and the reactive power error value inputs are based on the combined signal and the time delay;
   wherein the 2×2 decoupling controller is further configured to computationally decouple values of real power and reactive power in order to compute the frequency delta and the voltage delta.

8. The power system controller of claim 7 wherein the reference model computes the predicted frequency value and the predicted voltage value using a 2×2 matrix whose elements are functions of measured values of a source voltage V, a bus voltage E, an impedance X, and a relative angle between the source and the bus $\delta$.

9. The power system controller of claim 7 wherein the 2×2 decoupling controller is implemented using four PID controllers.

10. The power system controller of claim 7 wherein the time delay is less than 100 ms.

11. The power system controller of claim 7 wherein the combined signal fed back by the feedback circuit includes (F,V) setpoint values.

12. The power system controller of claim 7 wherein the feeding back of the combined signal to the 2×2 decoupling controller comprises feeding back the combined signal to the frequency error value input and the separate voltage error value input.

13. A method for bumpless and balanceless power transfer switching between a macrogrid and a microgrid comprising a generator and 2×2 decoupled controller, the method comprising: automatically adjusting the generator speed until a difference between a voltage phase angle between the microgrid and the macrogrid is zero; switching power between the macrogrid and the microgrid when the voltage phase angle difference is zero;

turning on the 2×2 decoupled controller when the switching is made;

maintaining a power factor of the microgrid at a desired ratio using the 2×2 decoupled controller, a reference model and a feedback circuit;

the 2×2 decoupling controller having a real power error value input and separate reactive power error value input, a frequency delta value output and separate voltage delta value output, and a processor configured to compute the frequency delta value by independently and simultaneously changing values corresponding to both the real power error value and the reactive power error value using a matrix of four controllers, and configured to compute the voltage delta value by independently and simultaneously changing values corresponding to both the real power error value and the reactive power error value using the matrix of four controllers;

the reference model having a processor configured to compute from the frequency delta value and the voltage delta value a predicted real power value and a predicted reactive power value using a 2×2 matrix whose elements are functions of measured values;

the feedback circuit combining outputs of the reference model with real-time measured real and reactive power values from a generator to form a combined signal, and feeding back the combined signal to the 2×2 decoupling controller, wherein the feeding back includes introducing a time delay of the predicted real power value and the predicted reactive power value;

wherein the real power error value input and the reactive power error value inputs are based on the combined signal and the time delay;

wherein the 2×2 decoupling controller is further configured to computationally decouple values of real power and reactive power in order to compute the frequency delta and the voltage delta.

* * * * *